(No Model.) 2 Sheets—Sheet 1.
A. MILLER.
SEED AND FERTILIZING DRILL.
No. 316,807. Patented Apr. 28, 1885.
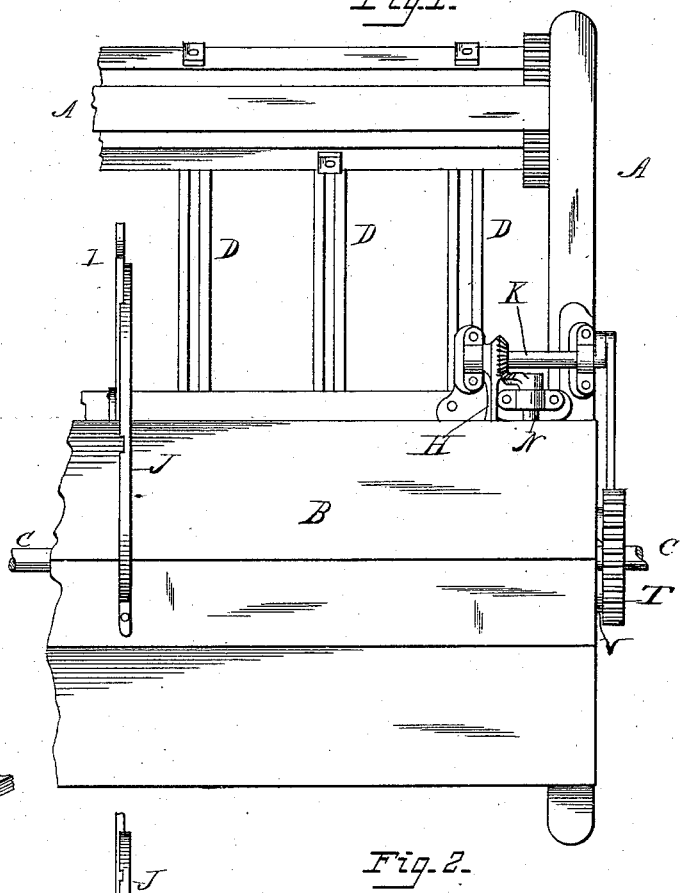
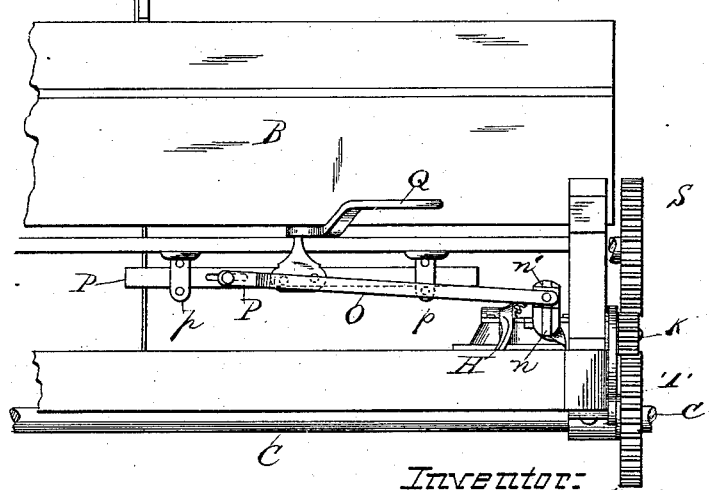
Attest:
H. S. Reeside
H. Bernhard
Inventor:
Abraham Miller
per Edson Bros.
Attorneys (No Model.) 2 Sheets—Sheet 2.
A. MILLER.
SEED AND FERTILIZING DRILL.
No. 316,807. Patented Apr. 28, 1885.
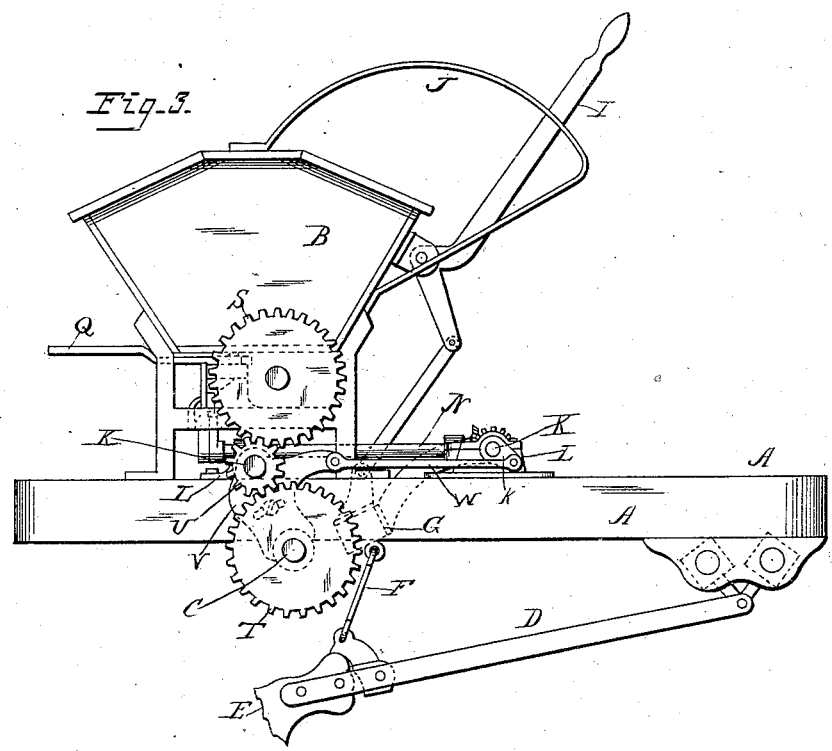
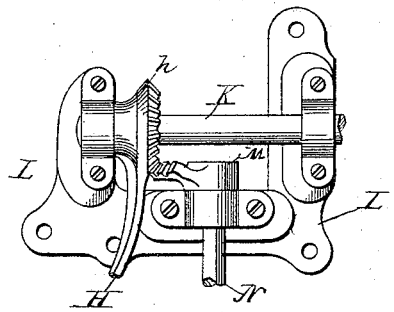
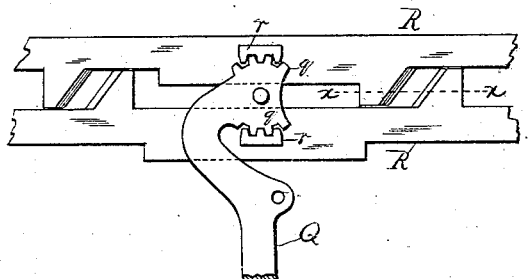
Attest:
W. F. Bernhard
D. F. Bernhard
Abraham Miller
Inventor:
by Eason Bro.
Attorneys.

UNITED STATES PATENT OFFICE.

ABRAHAM MILLER, OF NEWARK, ASSIGNOR TO THE NEWARK MACHINE COMPANY, OF COLUMBUS, OHIO.

SEED AND FERTILIZING DRILL.

SPECIFICATION forming part of Letters Patent No. 316,807, dated April 28, 1885.

Application filed August 23, 1884. (No model.)

*To all whom it may concern:*

Be it known that I, ABRAHAM MILLER, a citizen of the United States, residing at Newark, in the county of Licking and State of Ohio, have invented certain new and useful Improvements in Seed and Fertilizing Drills, of which the following is a specification, reference being had therein to the accompanying drawings, and in which—

Figure 1 is a plan view of so much of a seeding-machine as is necessary to illustrate my invention. Fig. 2 is a partial rear elevation of the same. Fig. 3 is a side elevation, partly in section, of a portion of a seed and fertilizer drill embodying my improvement. Fig. 4 is a plan view of the gear-segments connecting the boot-hoisting bar with the feed-rolls and regulating-slides, showing the means for supporting such gear-segments. Fig. 5 is a bottom plan view of the feed-regulating slides detached from the machine, showing the means whereby said slides are operated. Fig. 6 is a sectional view taken on the line $x\,x$, Fig. 5, of the slides at the feed-orifices thereof, showing the meeting edges of such feed-orifices; and Fig. 7 is an enlarged view of a portion of the feed-slides, showing the geared lug by which said slides are operated by the lever.

The same letters designate the same or corresponding parts in all the figures.

A is the carrying-frame supporting the operating parts. The wheels are omitted as unnecessary. B is the hopper, mounted nearly over the axle C. D D are the drag-bars, hung at their forward ends beneath the front end of the frame, and carrying at their rear ends the boots E for delivering the seed or fertilizer. These are suspended by the links F from the bar G, which is provided at each end with a rigid curved metallic rocking arm, H, but one of which is shown in the present case, pivoted on the frame so as to permit the bar to rock up or down immediately in front of the hopper to adjust the boots at various heights by means of a hand-lever, I, and notched bow J upon the hopper. These features I have made the subject-matter of a separate application, and they are only referred to as being essential to the understanding of the subject-matter of the present application.

In this application the curved rocking arm H has for its axis a rock-shaft, K, journaled in a casting, L, secured to the frame. The rocking arm H has a bevel pinion or segment, $h$, formed in one piece with or rigidly secured to the outer face of its enlarged portion or journal, which pinion gears with a second pinion or segment, M, rigidly secured upon the forward end of a second crank-shaft, N, journaled on the frame at a right angle to the first crank-shaft, K. The crank $n$ on the rear end of this second crank-shaft is adjustably connected by means of a tongue and grooved sliding block and a link, O, to a bar, P, sliding freely in guides $p$, mounted at the rear of the hopper B, as shown in Figs. 1 and 2. This sliding bar is pivotally connected to a horizontal lever, Q, provided with a rearwardly-projecting handle, the purpose of which will be presently explained. The lever itself is pivoted at its inner end upon the under side of the bottom of the hopper, or to another fixed support, as shown, and is formed with a head concentric with this pivot and provided with cogs $q$ at the front and rear side, engaging short racks $r$, projecting from the under surfaces of the two slides R R, which control the exit of the grain or fertilizer through openings in the bottom of the hopper. The lever Q between its pivot and the point where it is connected with the sliding bar is U-shaped, as shown, so as to pass freely around the rack on the rearward slide and allow full play for opening and closing the slides R R. The slides themselves move side by side on the bottom of the hopper, being formed, as shown in Figs. 5, 6, and 7, with beveled or knife edges diagonal to their line of movement, as shown, to cut off the material absolutely, when desired, without leaving openings for leakage, as is the case when some of the grain or fertilizer is caught between two square or blunt edges and holds them apart. A further disadvantage of these latter is the unequal distribution of the fertilizer, which drops in bunches when the slides are reopened.

It will be perceived that by this arrangement of the parts when the hand-lever is brought into operation to tilt the rocking bar and lift the boots clear of the ground, the same motion causes the bevel-gear to partially rotate the rock-shaft K, which moves the sliding bar P and lever Q, and cuts off the feed, and by the reverse motion, when the boots are lowered, the slides are reopened and the feed recommences. The sliding block $n'$ on the end of the crank-shaft $n$ also permits the adjustment of the slides, and consequently the rate of feed.

The rearwardly-projecting handle on the lever Q is for the purpose of enabling the operator to regulate the quantity fed by hand when desired, especially in case the mechanism for automatically opening and closing the slides should break or get out of order.

The feed-rolls (not shown herein) below the bottom of the hopper are operated by means of a pinion, S, mounted on one end of one of the feed-roll shafts, a pinion, T, upon the axle, and an intermediate pinion, U, which is journaled on a stud upon a crescent-shaped plate, V, formed with a bearing, straddling the axle C. This plate is caused to move back and forth by means of a link, W, connecting it with a crank-arm, $k$, on the outer end of the rock-shaft K in such a manner that when the boots are lifted and the slides are closed the same movement also throws the pinion U rearwardly, and out of gear with the pinion S, disconnects the rollers, and stops their rotation. The lowering of the boots and the reopening of the feed-slides are accompanied by the re-engagement of the pinions S U T and the starting of the feed-rolls into operation again.

Having thus fully described my invention, what I claim, and desire to secure by Letters Patent of the United States, is—

1. The combination of the hopper and its contained feed mechanism and slides, boots, and mechanism for raising and lowering said boots, with devices, as plate V and crank-shaft K, the latter being connected to said plate and geared to the feed-operating shaft for opening and closing the feed-slides, substantially as and for the purpose set forth.

2. The combination of the hopper, the reciprocating slides, the boots, mechanism, substantially as described, for hoisting the boots and closing the slides simultaneously, and devices, substantially as described, as link O, adjustably connected to the shaft N, whereby the throw of the slides may be adjusted to increase or diminish the openings between them, substantially as and for the purpose set forth.

3. The combination of the hopper, the slides in the bottom of the hopper, the lever by which they are reciprocated, the sliding bar, the link, the rock-shafts, the boots, and mechanism connected with said rock-shafts, substantially as described, for raising and lowering the boots, substantially as and for the purpose set forth.

4. The combination of the hopper, the slides, the boots, the link, the rock-shafts and their connections, and plate V, for raising or lowering the boots and simultaneously closing or opening the slides, substantially as and for the purpose set forth.

5. The combination, with a hopper, of horizontally-moving slides having upwardly-beveled edges which extend diagonally across their line of movement, as and for the purpose set forth.

6. The combination of the frame, the axle, the hopper, the boots, means for raising and lowering the boots, the pinions S T on the feed-roll shaft and axle, respectively, the intermediate pinion, U, plate V, rod W, and crank-shaft K, connected to said plate and geared to the feed-slide operating-shaft, substantially as described, whereby the said pinion is thrown out of gear when the boots are raised and re-engaged when they are lowered, substantially as and for the purpose set forth.

7. The combination of the hopper, the feed-slides, the carrying-frame, the boots, the hoisting-bar, its rigid arm rocking in bearings upon the frame, the rocking crank-shaft K, gearing with said arm, the link, the bar P, sliding in keepers, and the lever pivoted to the feed-slides, the hopper, and the sliding bar, substantially as and for the purpose set forth.

8. The combination, with the hopper, the two feed-slides, the sliding bar outside of the hopper, and means whereby motion is imparted to it simultaneously with the raising or lowering of the boots, of the lever pivoted between the slides and engaging them so as to cause them to move simultaneously in opposite directions, said lever being provided with a handle projecting rearwardly of the hopper, substantially as and for the purpose set forth.

9. The combination of the carrying-frame, the axle, the hopper, the feed-slides, the boots, the bar for raising or lowering the boots, the rocking arm mounted on the rocking crank-shaft, the second rock-shaft geared with the first and connected with the feed-slides, the pinions whereby motion is imparted from the axle to the feed-rolls, and mechanism connected with the first rock-shaft for disconnecting said pinions when the boots are raised, substantially as described.

In testimony whereof I affix my signature in presence of two witnesses.

ABRAHAM MILLER.

Witnesses:
CHAS. C. GRASSER,
GEO. D. GRASSER.